United States Patent [19]

Kimura et al.

[11] 4,057,600

[45] Nov. 8, 1977

[54] PROCESS FOR PRODUCING BLOCK COPOLYMERS

[75] Inventors: Akio Kimura; Kenji Seki; Mamoru Ukita; Satoshi Asahi, all of Sodegaura; Sanae Tagami, Ichihara, all of Japan

[73] Assignee: Idemitsu Kosan Company Limited, Tokyo, Japan

[21] Appl. No.: 747,937

[22] Filed: Dec. 6, 1976

[30] Foreign Application Priority Data

Dec. 16, 1975   Japan ................................ 50-149097

[51] Int. Cl.$^2$ ........................................... C08F 295/00
[52] U.S. Cl. ................................................. 260/878 B
[58] Field of Search ..................................... 260/878 B

[56] References Cited

U.S. PATENT DOCUMENTS

| | | | |
|---|---|---|---|
| 3,458,598 | 7/1969 | Craven | 260/878 B |
| 3,644,580 | 2/1972 | Craven | 260/878 B |
| 3,652,724 | 3/1972 | Shimomura et al. | 260/878 B |
| 3,692,712 | 9/1972 | Crouch et al. | 260/878 B |
| 3,699,190 | 10/1972 | Shimomura | 260/878 B |
| 3,769,368 | 10/1973 | Peyrot | 260/878 B |
| 3,851,015 | 11/1974 | Agouri et al. | 260/878 B |
| 3,887,650 | 6/1975 | Agouri et al. | 260/878 B |
| 3,932,369 | 1/1976 | Sartori et al. | 260/878 B |
| 3,949,016 | 4/1976 | Agouri et al. | 260/878 B |
| 3,949,018 | 4/1976 | Agouri et al. | 260/878 B |

*Primary Examiner*—Alan Holler
*Attorney, Agent, or Firm*—Flynn & Frishauf

[57] ABSTRACT

Block copolymers are produced by (i) polymerizing ethylene or propylene, or copolymerizing the same with another α-olefin of 2 to 7 carbon atoms in the presence of a Ziegler-type catalyst, and (ii) copolymerizing the resulting polymer or copolymer with a radical-polymerizable vinyl compound (e.g., methyl methacrylate) in the presence of an organic sulfoxide.

19 Claims, No Drawings

PROCESS FOR PRODUCING BLOCK COPOLYMERS

FIELD OF THE INVENTION

This invention relates to a process for producing block copolymers and, more particularly, it relates to a process for producing a block copolymer comprising a polymer of ethylene or propylene, or their copolymer with another α-olefin having from 2 to 7 carbon atoms, and a polymer of a vinyl compound.

BACKGROUND OF THE INVENTION

A block copolymer of a polyolefin and a polymer of a vinyl compound is expected to have better dye-affinity, hydrophilicity, adhesive ability and the like, while retaining the good properties of a polyolefin. Thus, various methods for producing block copolymers have been proposed. For example, one process comprises polymerizing olefins in the presence of a stereospecific catalyst to form polyolefins, and thereafter copolymerizing vinyl compounds and polyolefins in the presence of an alkylene oxide has been proposed (Japanese Patent Publication Gazette No. 8679/1969). However, by this process an alkylene oxide may be incorporated into the copolymer and thus this process is not advantageous.

SUMMARY OF THE INVENTION

In the course of detailed studies on the preparation of a copolymer of polyolefin and polymer of vinyl compound, we have found that polymers of ethylene or propylene or their copolymers with another α-olefin, and certain kinds of monomeric vinyl compounds can block copolymerize efficiently in the presence of an organic sulfoxide where the polymerization of an olefin described above is carried out in the presence of an ordinary Ziegler-type catalyst and the reaction system is in an active state. That is, the process of this invention is comprised of polymerizing olefins described above in the presence of a Ziegler-type catalyst, and then block copolymerizing the thus formed polymer with a radical polymerizable vinyl compound in the presence of an organic sulfoxide.

SPECIFIC EMBODIMENTS OF THE INVENTION

The process of the present invention for producing block copolymers comprises two steps; that is, the first step is for polymerization of an olefin or olefins and the second step is for block copolymerization of the polyolefin thus obtained and a vinyl compound without inactivating the polyolefin.

In the first step, ethylene or propylene is normally polymerized or copolymerized with an α-olefin in a hydrocarbon solvent in the presence of a Ziegler-type catalyst such as an organic aluminum compound and a titanium halide under atmospheric pressure or from medium to low pressure. This process is one embodiment of the well-known Ziegler polymerization process. Examples of α-olefins having from 2 to 7 carbon atoms which are copolymerized with ethylene or propylene are ethylene, propylene, butene-1, pentene-1, 3-methyl butene-1, hexene-1, 4-methyl pentene-1, 3-ethyl butene-1, heptene-1, 4,4-dimethyl pentene-1 and 1,3-dimethyl butene-1. Copolymerization of ethylene or propylene with the above-described olefins can be done by random copolymerization or block copolymerization procedures. As to hydrocarbon solvents for polymerization, aliphatic hydrocarbons such as pentane, hexane, heptane, octane, etc.; alicyclic hydrocarbons such as cyclopentane, cyclohexane, methylcyclohexane, etc., and aromatic hydrocarbons such as benzene, toluene, xylene, etc., are preferred examples.

As a catalyst used for polymerization of the olefins, a Ziegler-type catalyst is preferable as described above. A Ziegler-type catalyst designated in this invention means Ziegler and Natta catalysts. Generally, an organic metal compound or its hydrogenated compound wherein said metal is selected from the groups I to III of the Periodic Table and a transition metal compound (halide, alkoxide or acetyl acetonate) of the metal selected from groups IV to VI of the Periodic Table are used in combination. In the present invention, it is preferable to use a combination of an organic aluminum compound and a titanium halide as a Ziegler-type catalyst. Examples of organic aluminum compounds are trialkyl aluminums such as triethyl aluminum, triisobutyl aluminum, etc.; and dialkyl aluminum monohalides such as diethyl aluminum monochloride, diethyl aluminum monobromide, etc. Furthermore, organic zinc compounds such as diethylzinc can be employed successfully in place of an organic aluminum compound. Examples of titanium halides are tetrachloro titanium, trichloro titanium, dichloro titanium, etc., and, furthermore, titanium halides containing aluminum such as AA-type $TiCl_3$, i.e., aluminum activated $TiCl_3$, etc., can also be used effectively. Moreover, vanadium halide can also be used in place of titanium halide.

The molar ratio of an organic aluminum compound to a titanium halide is from 0.6 to 5.0, preferably from 1.0 to 3.0. The amount of mixed catalyst of an organic aluminum compound and titanium halide is not restrictive and is sufficient in an ordinary catalytic amount. Generally, the molar ratio of titanium halide : olefin is 1 : 10 – 100,000, preferably 1 : 500 – 20,000.

Polymerization or copolymerization can be done by blowing ethylene or propylene singly or in combination with another α-olefin under atmospheric pressure to 50 atmospheres of pressure. Under these conditions, polymerization or copolymerization is achieved by reacting at a temperature of from 30° to 150° C., preferably at 50° to 80° C., for 0.25 to 2 hours, and thus a partially inactivated polyolefin and a polyolefin having an active terminal group are obtained. Upon polymerization, hydrogen can be present in the reaction system as a molecular weight modifier if desired. In this case, hydrogen should be added at a range of from 0.25 to 2 times based on one mole of olefin for effective reaction.

In the second step of the present invention, a block copolymer is prepared by adding a vinyl compound and an organic sulfoxide compound to the polyolefins thus obtained to effect copolymerization. In this process, an organic halide can also be added if required. The additive vinyl compound is the starting material for formation of the desired block copolymer. An organic sulfoxide compound and an organic halide act as catalysts for effecting copolymerization efficiently. In the present invention, the order of addition of these additives is not restrictive and they can be added in any order.

A vinyl compound used in the present invention is a monomer which can be polymerized or copolymerized by free radical reaction; that is, it is required to be a radical-polymerizing vinyl compound. As examples of vinyl compounds, methacrylic esters such as methyl methacrylate, ethyl methacrylate, butyl methacrylate, hydroxyethyl methacrylate, etc.; acrylic esters such as methyl acrylate, ethyl acrylate, butyl acrylate, etc.; acrylic acid; methacrylic acid; ethacrylic acid; vinyl esters such as vinyl acetate, vinyl propionate, etc.; 4-vinyl pyridine; acrylonitrile are listed.

Preferable examples of organic sulfoxides are dialkyl sulfoxides such as dimethyl sulfoxide, diethyl sulfoxide, dibutyl sulfoxide, etc.; aromatic sulfoxides such as diphenyl sulfoxide, etc.; dialkoxy sulfoxides such as diethyl sulfite, dimethyl sulfite, etc.

In the second step, a block copolymer can be prepared efficiently by adding a vinyl compound and an organic sulfoxide to an active polyolefin. Furthermore, by adding an organic halide, block copolymers can be obtained more efficiently. Preferable examples of organic halides are carbon tetrachloride; carbon tetrabromide; chloroform; alkyl halogenated hydrocarbons such as dichloromethane, etc.; benzyl halide or its derivatives such as benzyl chloride, benzyl bromide, p-methyl benzyl chloride, etc.

As to amounts of additives described above, the amount of vinyl compound is not restrictive, but it is preferable to be from 1 to 100 times molar to the content of vinyl monomer in the copolymer. The molar ratio of organic sulfoxide to titanium halide is set at from 0.01 to 50, prreferably from 0.5 to 30, and the molar ratio of organic halide to organic sulfoxide is set at from 0.1 to 10, preferably from 0.5 to 5.0.

The desired block copolymer can be obtained by reacting the specified reactants for from 0.5 to 5 hours at a temperature of from 30° to 100° C., preferably at 40° to 80° C., under the conditions described above.

According to the process of the present invention, a polymer of a vinyl compound can be efficiently block copolymerized with a polyolefin. Furthermore, a copolymer thus obtained contains a very small amount of inactivated olefin homopolymer and homopolymer of the vinyl compound; and especially the content of the homopolymer, particularly the homopolymer of the vinyl compound, is extremely low compared with those obtained by conventional processes. Therefore, the copolymers obtained by this invention can be used without separating homopolymers of vinyl compounds. When it is required to separate a homopolymer described above, it can easily be eliminated by extraction with a solvent and a highly purified copolymer is obtained.

The copolymers obtained by the present invention are very useful in a wide range of uses, for example, said copolymers can be utilized as materials for various moldings; composite materials, starting materials for paints, construction materials, synthetic papers, etc.

EXAMPLES

The present invention is explained in detail by means of the following illustrative examples.

EXAMPLE 1

An autoclave made of pressure-resistant glass (content of 300 milliters) with openings for gas, thermometer, stirrer and inlet for reagents was swept with argon. Under the stream of argon, n-heptane (100 milliliters) was added as a solvent through a syringe, and then 0.5 millimole of AA-type titanium trichloride and 1.0 millimole of diethyl aluminum monochloride were added. The temperature was brought up to 70° C. while stirring, and then ethylene gas was introduced up to 5 atmospheres. Polymerization was carried out while keeping the temperature and gas pressure as indicated above for 30 minutes. After the reaction, ethylene was discharged, and then argon was bubbled therein for 5 minutes in order to remove residual ethylene. Subsequently, under the stream of argon, 6.0 grams of methyl methacrylate (designed as MMA hereafter), 3.0 millimoles of dimethyl sulfoxide (234 µl) and 3.0 millimoles of carbon tetrachloride (288 µl) were added in this order, and they were reacted for 2 hours at a temperature of 70° C. After the completion of the reaction, a small amount of methanol was added to stop the reaction. Therefore, large amounts of methanol were added to precipitate the polymer thus obtained. The polymer was filtered and dried under reduced pressure. The polymer thus obtained weighed 16.0 grams. A part of this (3.0 grams) was weighed exactly and was extracted for 8 hours with boiling acetone using a Soxhlet extractor in order to eliminate MMA homopolymer. By measurement of weight of the homopolymer extracted, the content of MMA homopolymer in the block copolymer thus obtained was found to be 19.3 weight percent. From the results of IR absorption spectrum, the content of MMA unit in the acetone-insoluble polymer was 33 weight percent (4.2 grams).

EXAMPLE 2

The experiment was carried out in the same manner as described in Example 1, except that carbon tetrachloride was not added. The polymer thus obtained weighed 12.0 grams. The content of MMA homopolymer in the polymer obtained was 39.2 weight percent. The content of MMA unit in the acetone-insoluble polymer was 12 weight percent (0.9 gram).

EXAMPLE 3

The procedure was carried out in the same manner as described in Example 1, except that 1.0 millimole of dimethyl sulfoxide and 6.0 grams of MMA were added in this order in place of adding 6.0 grams of MMA, 3.0 millimoles of dimethyl sulfoxide and 3.0 millimoles of carbon tetrachloride in this order. The polymer obtained weighed 5.5 grams. The content of MMA homopolymer in the polymer obtained was 20.8 weight percent and the content of MMA unit in the acetone-insoluble polymer was 11 weight percent (0.5 gram).

EXAMPLE 4

The experiment was carried out in the same manner as described in Example 1, except that 1.0 millimole of dimethyl sulfoxide and 1.0 millimole of carbon tetrachloride were added in place of 3.0 millimoles of dimethyl sulfoxide and 3.0 millimoles of carbon tetrachloride. As a result, the polymer obtained comprised 10.9 grams. The content of MMA homopolymer in the polymer obtained was 19.8 weight percent, and the content of MMA unit in the acetone-insoluble polymer was 38 weight percent (3.3 grams).

EXAMPLE 5

The procedure was carried out in the same manner as described in Example 1, except that 0.5 millimole of dimethyl sulfoxide and 0.5 millimole of carbon tetrachloride were added in place of 3.0 millimoles of dimethyl sulfoxide and 3.0 millimoles of carbon tetrachloride. As a result, the polymer obtained comprised 13.5 grams. The content of MMA homopolymer in the polymer obtained was 29.1 weight percent, and the content of MMA unit in the acetone-insoluble polymer was 11 weight percent (1.0 gram).

EXAMPLE 6

The procedure was carried out in the same manner as described in Example 1, except that 1.0 millimole of diethyl sulfite and 1.0 millimole of carbon tetrachloride were added in place of 3.0 millimoles of dimethyl sulfoxide and 3.0 millimoles of carbon tetrachloride. As a result, the polymer thus obtained weighed 9.5 grams. The content of MMA homopolymer in the polymer obtained was 5.4 weight percent and the content of MMA unit in the acetone-insoluble polymer was 2 weight percent (0.2 gram).

EXAMPLE 7

The experiment was carried out in the same manner as described in Example 1, except that 1.0 millimole of carbon tetrachloride, 1.0 millimole of dimethyl sulfoxide and 6.0 grams of MMA were added in this order in place of adding 6.0 grams of MMA, 3.0 millimoles of dimethyl sulfoxide and 3.0 millimoles of carbon tetrachloride in this order. As a result, the polymer obtained was 12.9 grams. The content of MMA homopolymer in the polymer obtained was 33.4 weight percent, and the content of MMA unit in the acetone-insoluble polymer was 25 weight percent (2.1 grams).

EXAMPLE 8

The same procedure was carried out as described in Example 1, except that 0.5 millimole of titanium trichloride reduced by diethyl aluminum monochloride in place of 0.5 millimole of AA-type titanium trichloride and 1.0 millimole of dimethyl sulfoxide and 1.0 millimole of benzyl chloride in place of 3.0 millimoles of dimethyl sulfoxide and 3.0 millimoles of carbon tetrachloride were used, and the temperature for polymerization of MMA and polyethylene was set at 50° C. As a result, the polymer obtained weighed 16.6 grams. The content of MMA homopolymer in the polymer thus obtained was 2.4 weight percent, and the content of MMA unit in the acetone-insoluble polymer was 15 weight percent (2.7 grams).

EXAMPLE 9

The experiment was carried out in the same manner as described in Example 4, except that the temperature for polymerization of MMA and polyethylene was set at 50° C. in place of 70° C. As a result, the polymer obtained comprised 10.1 grams. The content of MMA homopolymer in the polymer thus obtained was 7.7 weight percent, and the content of MMA unit in the acetone-insoluble polymer was 12 weight percent (1.1 grams).

EXAMPLE 10

The same procedure was carried out in the manner as described in Example 1, except that 1.0 millimole of dimethyl sulfoxide and 1.0 millimole of benzyl bromide in place of 3.0 millimoles of dimethyl sulfoxide and 3.0 millimoles of carbon tetrachloride were used, and the conditions for polymerization of MMA and polyethylene were set at 40° C. for 4 hours in place of 70° C. for 2 hours. As a result, the polymer obtained comprised 11.2 grams. The content of MMA homopolymer in the polymer thus obtained was 2.7 weight percent, and the content of MMA unit in the acetone-insoluble polymer was 6 weight percent (0.6 gram).

EXAMPLE 11

The experiment was carried out in the same manner as described in Example 1, except that 1.0 millimole of triethyl aluminum was used in place of 1.0 millimole of diethyl aluminum monochloride. As a result, the polymer obtained comprised 14.1 grams. The content of MMA homopolymer in the polymer thus obtained was 16.4 weight percent, and the content of MMA unit in the acetone-insoluble polymer was 29 weight percent (3.4 grams).

EXAMPLE 12

An autoclave made of pressure resistant glass (content of 300 milliliters) with openings for gas, thermometer, stirrer and inlet for reagents was swept with argon. Under the stream of argon, 100 milliliters of n-heptane were added as a solvent through a syringe, and then 0.5 millimole of AA-type titanium trichloride and 1.0 millimole of diethyl aluminum monochloride were added. The temperature was brought up to 70° C. while stirring and then hydrogen gas was introduced to 2.5 atmospheres, and furthermore, ethylene gas was introduced to 2.5 atmospheres. Polymerization was carried out for 30 minutes while keeping the temperature and gas pressure as indicated above. Thereafter, ethylene and hydrogen gas were discharged from the system and argon was bubbled for 5 minutes in order to release residual ethylene. Subsequently, under the stream of argon, 6.0 grams of MMA, 1.0 millimole of dimethyl sulfoxide and 1.0 millimole of carbon tetrachloride were added in this order and they were reacted for 2 hours at 50° C. After the completion of the reaction, the reaction was terminated by adding a small amount of methanol. Thereafter, large amounts of methanol were added to precipitate the polymer thus obtained. The polymer was filtered and dried under reduced pressure. The polymer thus obtained was 10.1 grams. A part of this (3.0 grams) was weighed exactly and was extracted for 8 hours with boiling acetone using a Soxhlet extractor in order to eliminate MMA homopolymer. By measuring weight of the homopolymer extracted, the content of MMA homopolymer in the block copolymer thus obtained was found to be 19.3 weight percent. From the results of the IR absorption spectrum, the content of MMA unit in the acetone-insoluble polymer was 38 weight percent (3.1 grams).

EXAMPLE 13

The same procedure was carried out in the manner as described in Example 4, except that a prescribed vinyl compound was used instead of MMA, and the reaction temperature for polymerization of polyethylene and the vinyl compound was set as a prescribed temperature and, furthermore, a prescribed solvent was used for extracting respective homopolymers in place of acetone. Results are shown in Table I as shown below.

Table I

| Vinyl Compound | Amount added (gram) | Polymerization temperature (° C) | Yield (gram) | Content of homopolymer of vinyl compound in the polymer (weight percent) | Content of vinyl compound unit in the solvent insoluble polymer (weight percent) | Solvent for extraction |
| --- | --- | --- | --- | --- | --- | --- |
| Vinyl acetate | 6.0 | 70 | 7.9 | 2.2 | 3 | Acetone |
| Methyl acrylate | 10.0 | 70 | 9.5 | 4.2 | 13 | Acetone |
| Acrylic acid | 10.0 | 50 | 7.3 | 5.8 | 13 | Ethanol |
| Hydroxyethyl methacrylate | 10.0 | 50 | 16.1 | 6.3 | 65 | Ethanol |

EXAMPLE 14

An autoclave made of pressure-resistant glass (content of 300 milliliters) with openings for gas, opening for charging an olefin from a pressure-resistant glass cylinder, thermometer, stirrer and inlet for reagents was swept with argon. Under the stream of argon, n-heptane (100 milliliters) was added as a solvent through a syringe, and then 0.5 millimole of $TiCl_3$ and 1.0 millimole of diethyl aluminum monochloride were added. The temperature was brought up to 70° C. while stirring, and then 10 grams of propylene were added from the pressure-resistant glass cylinder, and polymerization reaction was carried out for 2 hours. After the reaction, the pressure was lowered, and then argon was blown therein for 10 minutes to remove residual propylene. Subsequently, under a stream of argon, 6.0 grams of MMA, 1.0 millimole of dimethyl sulfoxide and 1.0 millimole of carbon tetrachloride were added in this order, and they were reacted for 2 hours at 70° C.

After completion of the reaction, a small amount of methanol was added to stop the reaction. Thereafter, large amounts of methanol were added to precipitate the polymer. The polymer was filtered and dried under reduced pressure. The polymer thus obtained comprised 5.3 grams.

A part of this (3.0 grams) was weighed exactly, and was extracted for 8 hours with boiling acetone using a Soxhlet extractor in order to eliminate MMA homopolymer. By measurement of the weight of the homopolymer extracted, the content of MMA homopolymer in the block copolymer thus obtained was found to be 1.2 weight percent. From the results of IR absorption spectrum, the content of MMA unit in the acetone-insoluble polymer was 33.8 weight percent.

EXAMPLE 15

The experiment was carried out in the same manner as described in Example 14, except that 1.0 millimole of diethyl aluminum monochloride was replaced with 1.0 millimole of triethyl aluminum.

The block copolymer obtained was 6.1 grams and the content of MMA homopolymer in the block copolymer was 19.1 weight percent. And the amount ot MMA unit in the acetone-insoluble polymer was 30.4 weight percent.

EXAMPLE 16

The experiment was carried out in the same manner as Example 14, except that 1.0 millimole of carbon tetrachloride was replaced with 1.0 millimole of benzyl chloride. The block copolymer obtained comprised 6.1 grams, and the content of MMA homopolymer in the block copolymer was 12.1 weight percent. And the amount of MMA unit in the acetone-insoluble polymer was 27.0 weight percent.

EXAMPLE 17

The experiment was carried out in the same manner as Example 14, except that 6.0 grams of MMA were replaced with 6.0 grams of acrylonitrile, and dimethyl formamide was used as the extracting solvent in place of acetone.

The block copolymer obtained was 5.7 grams, and the content of homopolymer of acrylonitrile in the block copolymer was 11.5 weight percent. And the amount of acrylonitrile unit in the dimethyl formamide-insoluble polymer was only a trace.

EXAMPLE 18

The experiment was carried out in the same manner as Example 14, except that 6.0 grams of MMA were replaced with 6.0 grams of acrylic acid and methanol was used as the extracting solvent in place of acetone. The block copolymer obtained was 8.0 grams and the amount of homopolymer of acrylic acid in the block copolymer was 1.5 weight percent. And the amount of acrylic acid unit in the methanol-insoluble polymer was 19.7 weight percent.

EXAMPLE 19

The experiment was carried out in the same manner as Example 14, except that 6.0 grams of MMA were replaced with 6.0 grams of 4-vinyl pyridine and methanol was used as the extracting solvent in place of acetone. The block copolymer obtained was 5.9 grams, and the amount of homopolymer of 4-vinyl pyridine in the block copolymer was 1.2 weight percent. And the amount of 4-vinyl pyridine unit in the methanol-insoluble polymer was 5.3 weight percent.

EXAMPLE 20

An autoclave made of pressure-resistant glass (content of 1,000 milliliters) with openings for gas, opening for charging an olefin from a pressure-resistant glass cylinder, thermometer, stirrer and inlet for reagents was swept with argon. Under the stream of argon, n-heptane (500 milliliters) was added as a solvent through a syringe and then 6.0 millimoles of diethyl aluminum monochloride and 3.0 millimoles of $TiCl_3$ were added. The temperature was brought up to 70° C. while stirring and then propylene gas was introduced up to 5 atmospheres from a pressure-resistant glass cylinder. Polymerization was carried out for 1 hour keeping the gas pressure and temperature as indicated above. After the reaction, the pressure was lowered and then argon was blown therein for 10 minutes to remove residual propylene. Subsequently, under the stream of argon, 10.0 grams of MMA, 6.0 millimoles of dimethyl sulfoxide and 6.0 millimoles of carbon tetrachloride were added in this order, and they were reacted for 3 hours at 70° C.

After the completion of reaction, a small amount of methanol was added to stop the reaction. Thereafter, large amounts of methanol were added to precipitate the polymer. The polymer was filtered and dried under reduced pressure. The polymer thus obtained was 40.6 grams.

A part of this (5.0 grams) was weighed exactly and was extracted for 8 hours with boiling acetone using a Soxhlet extractor in order to eliminate MMA homopolymer. By the measurement of weight of the homopolymer extracted, the content of MMA homopolymer in the block copolymer obtained was found to be 12.5 weight percent. From the results of the IR absorption spectrum, the content of MMA unit in the resulting acetone-insoluble polymer was 9.8 weight percent.

EXAMPLE 21

An autoclave made of pressure-resistant glass (content of 1,000 milliliters) with opening for gas, opening for charging an olefin from a pressure-resistant glass cylinder, thermometer, stirrer and inlet for reagents was swept with argon. Under the stream of argon, n-heptane (400 milliliters) was added as a solvent through a syringe, and then 4.0 millimoles of $TiCl_3$ reduced by diethyl aluminum sesquichloride and 6.0 millimoles of diethyl aluminum monochloride were added. The temperature was brought up to 80° C. while stirring and then hydrogen gas was introduced up to 4 atmospheres. Subsequently, 10 milliliters of hexene-1 were added and then ethylene gas was introduced up to 8 atmospheres from the pressure-resistant glass cylinder. Polymerization was carried out for 2 hours keeping the gas pressure and temperature as described above. After the reaction, the pressure was lowered and then argon was blown therein for 10 minutes to remove residual ethylene and hexene-1. Subsequently, under a stream of argon, 20.0 grams of MMA, 6.0 millimoles of dimethyl sulfoxide and 6.0 millimoles of carbon tetrachloride were added in this order, and they were reacted for 2 hours at 70° C.

After the completion of reaction, a small amount of methanol was added to stop the reaction. Thereafter, a large amount of methanol was added to precipitate the polymer. The polymer was filtered and dried under reduced pressure. The polymer thus obtained comprised 189 grams.

A part of this (3.0 grams) was weighed exactly and was extracted for 8 hours with boiling acetone using a Soxhlet extractor in order to eliminate MMA homopolymer. By the measurement of weight of the homopolymer extracted, the content of MMA homopolymer in block copolymer obtained was 2.0 weight percent. From the results of IR absorption spectrum, the content of MMA unit in the acetone-insoluble polymer was 6.7 weight percent. In addition, the content of hexene-1 unit in copolymer of ethylene and hexene-1 was 8.0 weight percent (2.8 mole percent).

What is claimed is:

1. A process for producing a block copolymer which comprises
   i. polymerizing ethylene or propylene or copolymerizing ethylene or propylene with another α-olefin having from 2 to 7 carbon atoms in the presence of a Ziegler-type catalyst comprising (a) an organic metal compound or a hydrogenated compound thereof wherein the metal is selected from groups I to III of the Periodic Table and (b) a transition metal compound of a metal selected from groups IV to VI of the Periodic Table, and
   ii. copolymerizing the resultant polymer or copolymer with a radical-polymerizable vinyl compound in the presence of an organic sulfoxide.

2. Process according to claim 1, wherein said α-olefin having from 2 to 7 carbon atoms is selected from the group consisting of ethylene, propylene, butene-1, pentene-1, 3-methyl butene-1, hexene-1, 4-methyl pentene-1, 3-ethyl butene-1, heptene-1, 4,4-dimethyl pentene-1 and 3,3-dimethyl butene-1.

3. Process according to claim 1, wherein said Ziegler-type catalyst is a catalyst comprising an organic aluminum compound and a titanium halide.

4. Process according to claim 3, wherein the molar ratio of said catalyst components is from 0.6 to 5.0 of the organic aluminum compound to the titanium halide.

5. Process according to claim 1, wherein said radical-polymerizable vinyl compound is a member selected from the group consisting of acrylic acid, methacrylic acid, ethacrylic acid, an acrylic ester, a methacrylic ester, a vinyl ester, 4-vinyl pyridine and acrylonitrile.

6. Process according to claim 1, wherein said organic sulfoxide is a member selected from the group consisting of a dialkyl sulfoxide, an aromatic sulfoxide and a dialkoxy sulfoxide.

7. Process according to claim 1, wherein (i) is carried out in the presence of hydrogen gas.

8. Process according to claim 1, wherein an organic halide is present with said organic sulfoxide.

9. Process according to claim 8, wherein said organic halide is a member selected from the group consisting of carbon tetrachloride, carbon tetrabromide, chloroform, dichloromethane, benzyl chloride, benzyl bromide and p-methyl benzyl chloride.

10. Process according to claim 1, wherein the molar ratio of the organic sulfoxide to the titanium halide is from 0.01 to 50.

11. Process according to claim 8, wherein the molar ratio of the organic halide to the organic sulfoxide is from 0.1 to 10.

12. Process according to claim 1, wherein the temperature in (ii) is from 30° to 100° C.

13. Process according to claim 1, wherein the organic sulfoxide is dimethyl sulfoxide.

14. Process according to claim 8, wherein the organic halide is carbon tetrachloride.

15. Process according to claim 1, wherein ethylene is used in (i).

16. Process according to claim 1, wherein propylene is used in (i).

17. Process according to claim 1, wherein the radical-polymerizable vinyl compound is methyl methacrylate.

18. Process according to claim 1, wherein (a) is an organic zinc compound.

19. Process according to claim 1, wherein (b) is a vanadium halide.

* * * * *